(12) United States Patent
Ge et al.

(10) Patent No.: US 9,685,177 B2
(45) Date of Patent: Jun. 20, 2017

(54) SENSOR STABILIZATION IN A MULTIPLE SENSOR MAGNETIC REPRODUCING DEVICE

(71) Applicant: Seagate Technology LLC, Cupertino, CA (US)

(72) Inventors: Zhiguo Ge, Edina, MN (US); Shaun E. Mckinlay, Eden Praire, MN (US); Eric W. Singleton, Maple Plain, MN (US); LiWen Tan, Eden Prairie, MN (US); Jae Young Yi, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/793,988

(22) Filed: Jul. 8, 2015

(65) Prior Publication Data

US 2017/0011759 A1    Jan. 12, 2017

(51) Int. Cl.
*G11B 5/39* (2006.01)
*G11B 5/127* (2006.01)

(52) U.S. Cl.
CPC .......... *G11B 5/3932* (2013.01); *G11B 5/1272* (2013.01); *G11B 5/3912* (2013.01)

(58) Field of Classification Search
None
See application file for complete search history.

(56) References Cited

U.S. PATENT DOCUMENTS 4,179,720 A * 12/1979 Miura .................. G11B 5/3903
360/315

6,129,957 A * 10/2000 Xiao ...................... B82Y 10/00
427/131

(Continued)

FOREIGN PATENT DOCUMENTS

EP        0694788 A2 *  1/1996  ............. B82Y 25/00
JP     2001176034 A  *  6/2001
(Continued)

OTHER PUBLICATIONS

English-machine translation of JP 2001-176034 A to Xiao et al., published on Jun. 29, 2001.*

*Primary Examiner* — Will J Klimowicz
(74) *Attorney, Agent, or Firm* — Westman, Champlin & Koehler, P.A.

(57) ABSTRACT

A multi-sensor reader that includes a first sensor that has a sensing layer with a magnetization that changes according to an external magnetic field. The first sensor also includes first and second side biasing magnets having a magnetization substantially along a first direction. The first and second side biasing magnets align the magnetization of the sensing layer substantially along the first direction when the sensing layer is not substantially influenced by the external magnetic field. The multi-sensor reader further includes a second sensor that is stacked over the first sensor. The second sensor includes a reference layer that has a magnetization that is set substantially along a second direction. The first sensor further includes at least one sensor-stabilization feature that counteracts an influence of a magnetic field utilized to set the magnetization of the reference layer of the second sensor in the second direction on the magnetization of at least one of the first and second side biasing magnets in the first direction.

6 Claims, 16 Drawing Sheets

(56) References Cited

U.S. PATENT DOCUMENTS

| | | | |
|---|---|---|---|
| 7,324,303 B2 * | 1/2008 | Ozue | G11B 5/534 360/121 |
| 7,564,659 B2 * | 7/2009 | Freitag | G01R 33/093 360/324.11 |
| 8,451,567 B2 * | 5/2013 | Zhou | G01R 33/098 29/603.14 |
| 8,531,801 B1 * | 9/2013 | Xiao | G11B 5/3909 360/319 |
| 8,576,518 B1 * | 11/2013 | Zeltser | G11B 5/3912 360/319 |
| 8,630,069 B1 * | 1/2014 | Okawa | G11B 5/3932 360/319 |
| 8,638,530 B1 * | 1/2014 | Hsu | G11B 5/3912 360/319 |
| 8,749,926 B1 * | 6/2014 | Le | G11B 5/3909 360/319 |
| 8,780,505 B1 * | 7/2014 | Xiao | G11B 5/3909 360/319 |
| 8,780,506 B1 * | 7/2014 | Maat | G11B 5/3912 360/319 |
| 8,896,974 B2 * | 11/2014 | Kawasaki | G11B 5/3932 360/319 |
| 8,995,096 B2 * | 3/2015 | McKinlay | G11B 5/112 360/319 |
| 9,087,527 B1 * | 7/2015 | Li | G11B 5/02 |
| 9,099,125 B1 * | 8/2015 | Hattori | G11B 5/3912 |
| 9,230,577 B2 * | 1/2016 | Zhang | G11B 5/3932 |
| 9,230,578 B2 * | 1/2016 | Batra | G11B 5/3909 |
| 9,324,342 B2 * | 4/2016 | Sapozhnikov | G11B 5/115 |
| 9,431,031 B1 * | 8/2016 | Xiao | G11B 5/11 |
| 2005/0068684 A1 * | 3/2005 | Gill | G11B 5/33 360/314 |
| 2006/0002032 A1 * | 1/2006 | Li | G11B 5/127 360/315 |
| 2012/0087045 A1 * | 4/2012 | Yanagisawa | B82Y 25/00 360/294 |
| 2012/0087046 A1 * | 4/2012 | Yanagisawa | G01R 33/098 360/294 |
| 2012/0147504 A1 * | 6/2012 | Zhou | G01R 33/098 360/324.12 |
| 2012/0250189 A1 * | 10/2012 | Degawa | G01R 33/093 360/235.4 |
| 2012/0281320 A1 * | 11/2012 | Singleton | G01R 33/093 360/319 |
| 2012/0327537 A1 * | 12/2012 | Singleton | G11B 5/3912 360/244 |
| 2015/0062735 A1 * | 3/2015 | Sapozhnikov | G11B 5/115 360/46 |

FOREIGN PATENT DOCUMENTS

| | | | |
|---|---|---|---|
| JP | 3255872 B2 * | 2/2002 | B82Y 10/00 |
| JP | 2002204009 A * | 7/2002 | |
| JP | 2003017784 A * | 1/2003 | |
| JP | 2007311400 A * | 11/2007 | |

* cited by examiner

SENSOR STABILIZATION IN A MULTIPLE SENSOR MAGNETIC REPRODUCING DEVICE

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities.

SUMMARY

The present disclosure relates to a multi-sensor reader that addresses challenges posed by greater data density requirements and faster data transfer speeds and includes one or more features that address sensor-stabilization needs. The multi-sensor reader includes a first sensor that has a sensing layer with a magnetization that changes according to an external magnetic field. The first sensor also includes first and second side biasing magnets having a magnetization substantially along a first direction. The first and second side biasing magnets align the magnetization of the sensing layer substantially along the first direction when the sensing layer is not substantially influenced by the external magnetic field. The multi-sensor reader further includes a second sensor that is stacked over the first sensor. The second sensor includes a reference layer that has a magnetization that is set substantially along a second direction. The first sensor further includes at least one sensor-stabilization feature that counteracts an influence of a magnetic field utilized to set the magnetization of the reference layer of the second sensor in the second direction on the magnetization of at least one of the first and second side biasing magnets in the first direction.

Other features and benefits that characterize embodiments of the disclosure will be apparent upon reading the following detailed description and review of the associated drawings.

DETAILED DESCRIPTION OF ILLUSTRATIVE EMBODIMENTS

Magnetic reproducing device embodiments described below relate to multi-sensor readers that include one or more sensor-stabilization features. However, prior to providing additional details regarding the different embodiments, a description of an illustrative operating environment is provided below.

Figure 1:
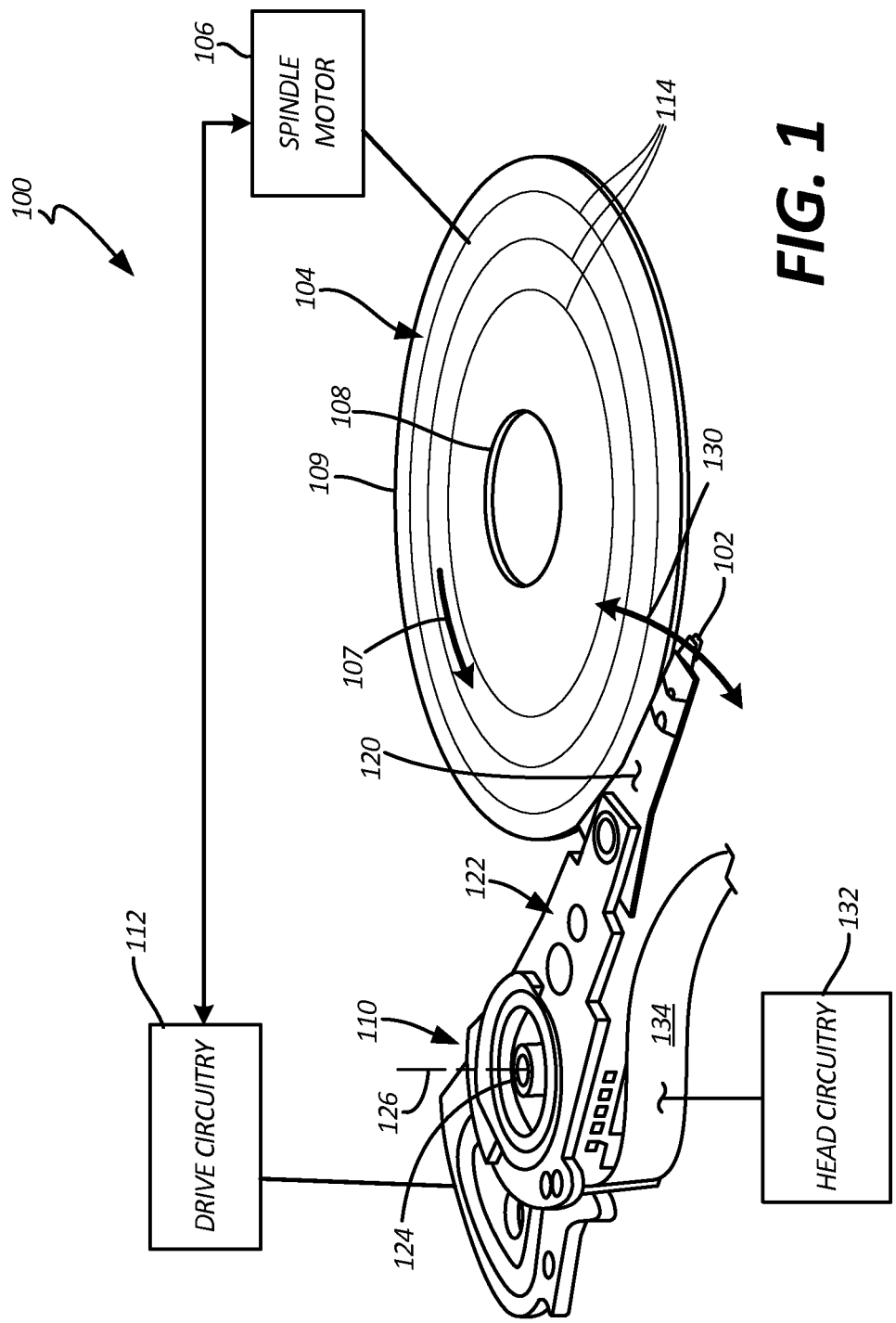
FIG. 1 is a schematic illustration of a data storage system including a data storage medium and a head for reading data from and/or writing data to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
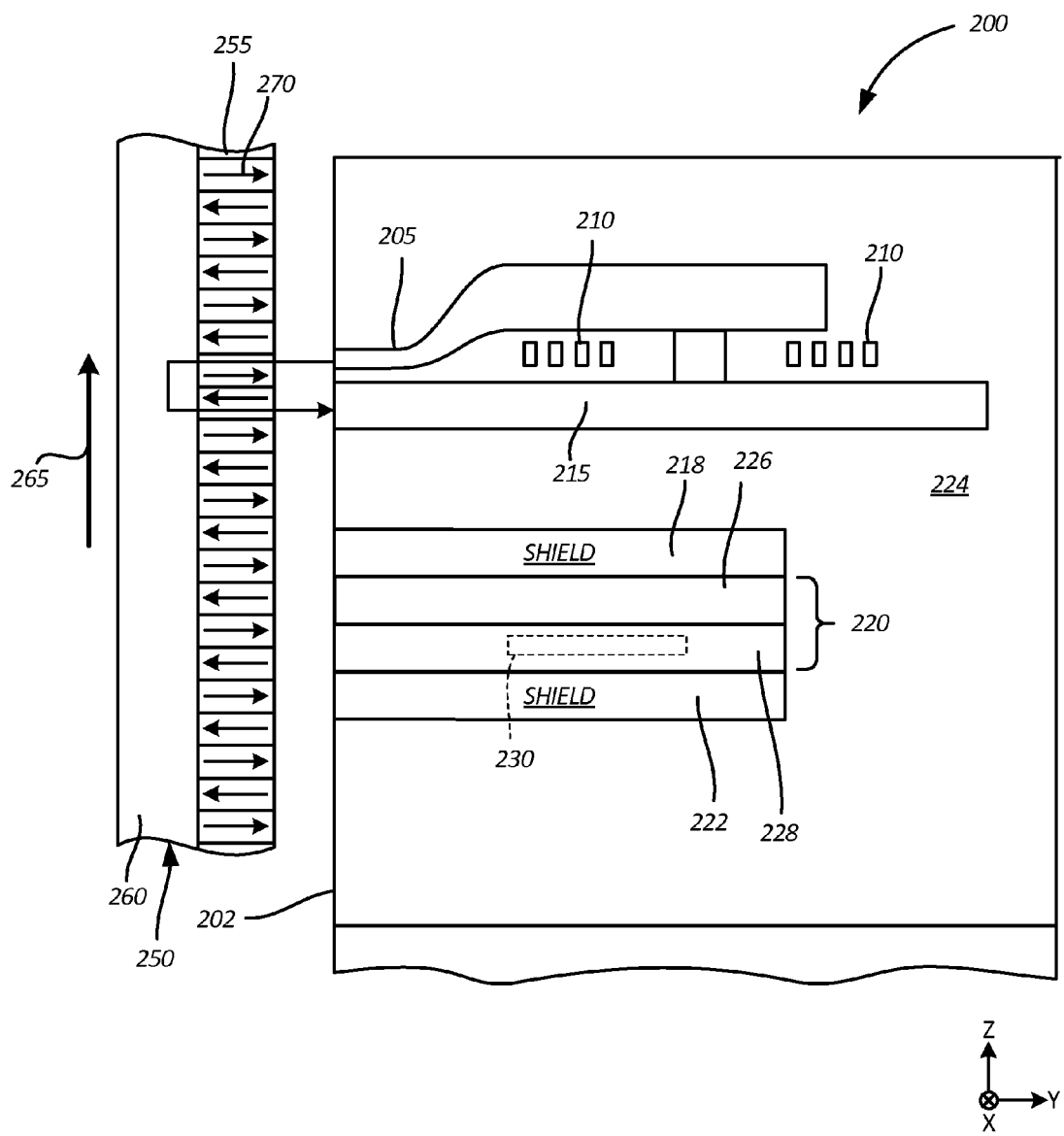
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

Figure 3A:
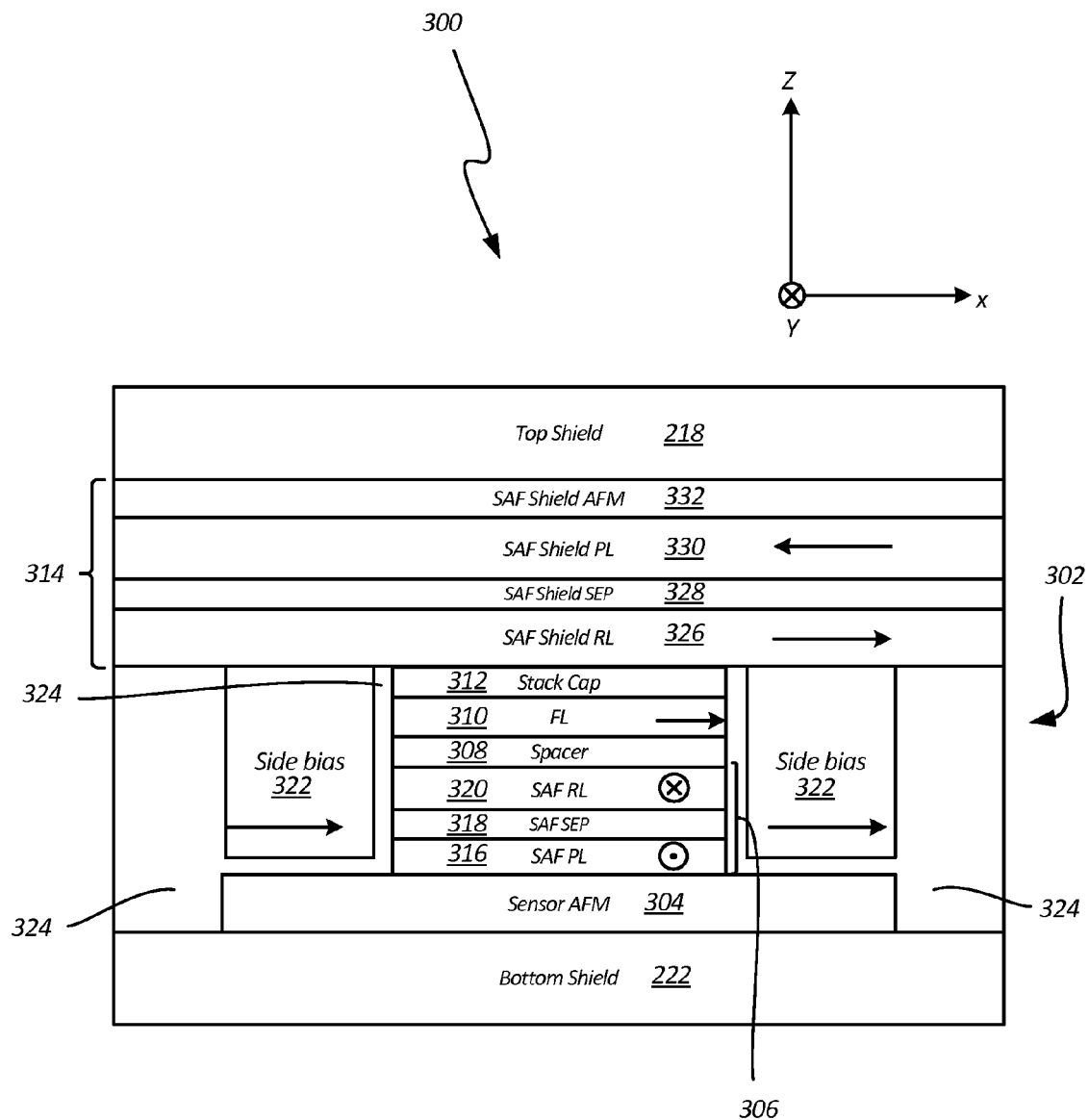
FIG. 3A is an air bearing surface view of a magnetic reproducing device having a single read sensor.
Figure 3B:
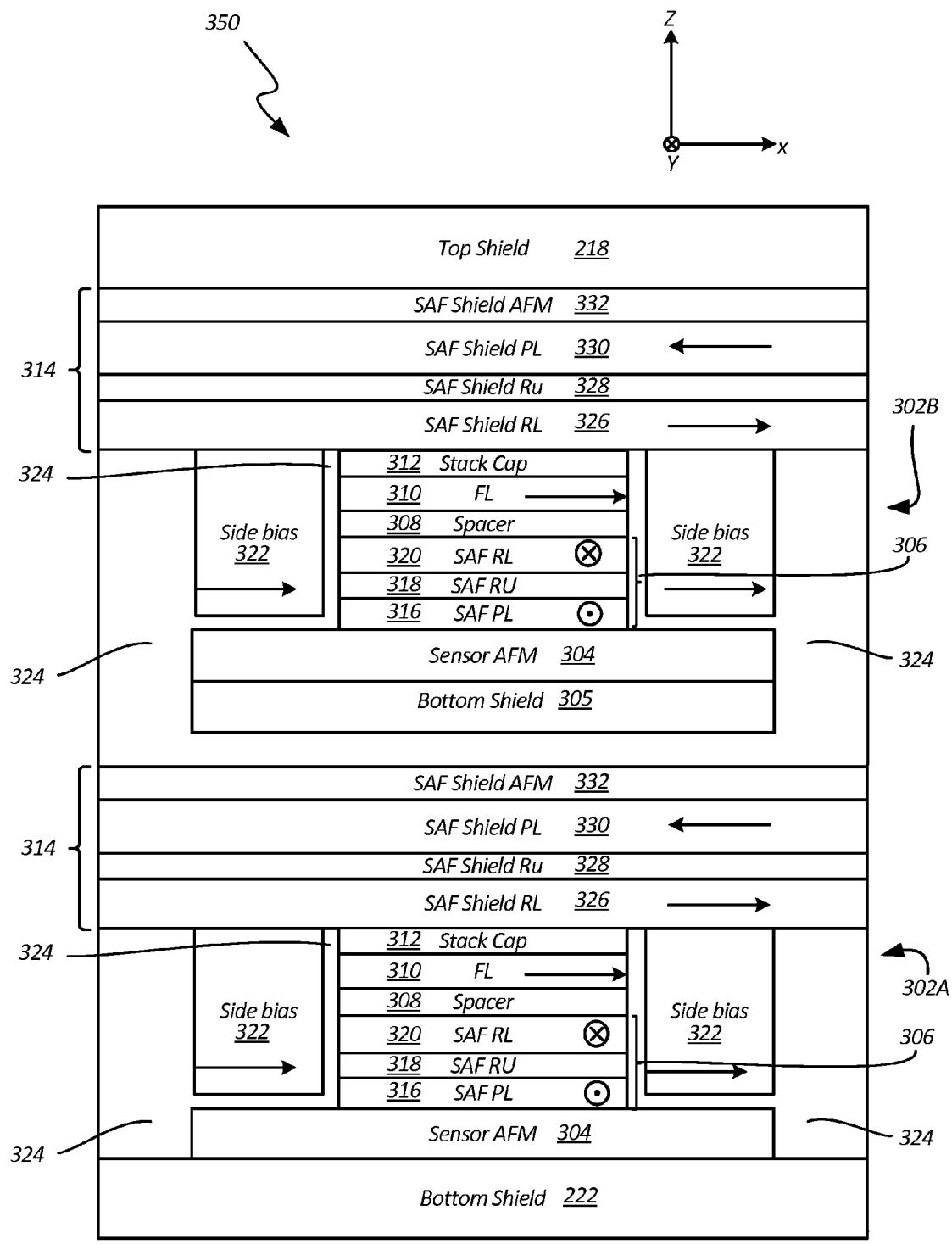
FIG. 3B is an air bearing surface view of a magnetic reproducing device having multiple sensors of the type shown in FIG. 3A.

As noted above, to address challenges posed by greater data density requirements and faster data transfer speeds, read transducer 220 includes multiple sensors 226 and 228. It should be noted that only two sensors 226 and 228 are shown in FIG. 2 in the interest of simplification. However, in different multi-sensor reader embodiments, any suitable number of sensors may be employed. In different multi-sensor reader embodiments, magnetic sensors may be stacked along a track direction (i.e., a z-direction in FIG. 2) or a track width direction that is perpendicular to the track direction (i.e., a cross-track direction, which is an x-direction in FIG. 2). A y-direction in FIG. 2 is then defined as a direction that is perpendicular to x and z simultaneously, which is a stripe-height direction. In the embodiment of FIG. 2, at least one of sensors 226 and 228 includes a sensor-stabilization feature 230. Different layers of an embodiment of an individual sensor are shown in FIG. 3A, and FIG. 3B shows a multi-sensor reader including two sensors of the type shown in FIG. 3A. Details regarding stabilization of a multi-reader sensor are then provided below in connection with FIGS. 4-7.

FIG. 3A is a schematic block diagram illustrating an example read head 300 including a single magnetoresistive sensor 302. The magnetoresistive sensor 302 is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a sensor antiferromagnetic (AFM) layer 304, sensor stack synthetic antiferromagnetic (SAF) structure 306, a spacer layer 308, a free layer or sensing layer 310, stack cap 312 and a SAF shielding structure 314.

In the embodiment shown in FIG. 3A, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (i.e., the y direction) of FIG. 3A and anti-parallel to each other.

In one implementation, the free layer 310 is not exchange coupled to, for example, an antiferromagnet. As a result, the magnetic moment of the free layer 310 is free to rotate under the influence of an applied magnetic field in a range of interest. The read head 200 further includes side biasing magnets 322, which produce a magnetic field that biases the free layer 310 with a magnetic moment parallel to the plane of the figure and generally oriented horizontally. This bias prevents the magnetic moment of the free layer 310 from drifting due to, for example, thermal energy, which may introduce noise into the data sensed by the read head 300. The bias is sufficiently small, however, that the magnetic moment of the free layer 310 can change in response to an applied magnetic field, such as a magnetic field of a data bit stored on the data discs. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3A.

In the embodiment shown in FIG. 3A, SAF shielding structure includes a SAF shield reference layer 326, a thin SAF shield separation layer 328, which may comprise a metal such as Ru in some embodiments, a SAF shield pinned layer 330 and a SAF shield AFM layer 332. Additionally, in some embodiments, there may be non-magnetic metal inserts (not shown) between SAF shield AFM 332 and top shield 218, and between sensor AFM 304 and bottom shield 222.

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moment of the free layer 310 is rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

FIG. 3B is a schematic block diagram illustrating an example read head 350 including multiple magnetoresistive sensors (for example, 302A and 302B) stacked along a track direction (i.e., the z-direction in FIG. 3B). Each of sensors 302A and 302B is substantially similar to sensor 302 of FIG. 3A and therefore a description of individual sensors 302A and 302B is not provided in connection with FIG. 3B. It should be noted that, depending on a direction of rotation of the data storage medium and the head design, one of top shield 218 and bottom shield 222 of sensor 302A is the leading shield for the entire read head such as 350 and the other one of top shield 218 and bottom shield 222 of sensor 302A is the trailing shield for the entire read head such as 350. However, sensor 302B has its own bottom shield denoted by reference numeral 305.

In some embodiments, formation of a multiple sensor device such as 350 involves stacking of individual ones of n magnetic sensors one above the other in the z direction. During formation of the multiple sensor device, when aligning reference layer 320 of the last or $n^{th}$ sensor (for example, sensor 302B) such that the magnetic moment of that reference layer is in the y direction, the side biasing magnets of the first through the $(n-1)^{th}$ sensor (for example, side biasing magnets 322 of sensor 302A) may be set to the y direction as well such that their function of biasing the free layer or sensing layer 310 of, for example, sensor 302A may substantially be lost. Therefore, in some embodiments, a technique with which magnetic moments of reference layers 320 and side biasing magnets 322 of individual sensors (for example, sensors 302A, 302B) can be set to a desired direction is needed for development of multiple sensor magnetic reproducing devices.

Figure 4A:
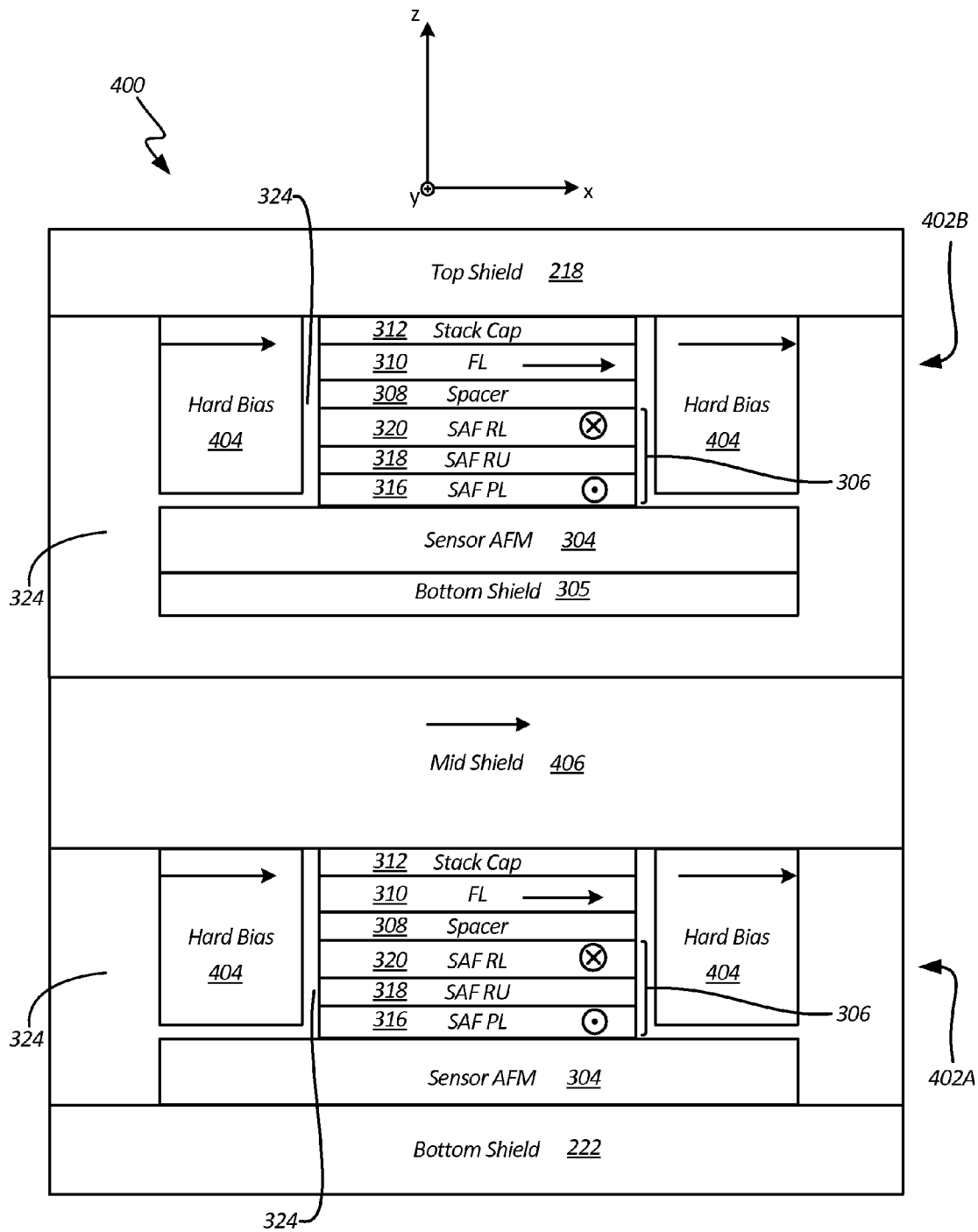
FIGS. 4A-4E are air bearing surface views of multiple sensor reproducing devices that include side biasing magnets having hard magnetic layers.

In some embodiments, side biasing of individual sensors of a multiple sensor device is provided by hard magnetic layers. Hard magnetic layers may be films with coercivity values larger than about 1000 Oe (Oersted), for example, CoPt, FePt, etc., which will not be substantially disturbed by external fields smaller than that number. However, hard magnetic layers with any suitable coercivity values may be used. One embodiment that employs hard magnetic layers is shown in FIG. 4A, which is a bearing surface view of a multiple sensor read head 400 including individual sensors 402A and 402B. In FIG. 4A, side biasing magnets 404 are substantially entirely formed of hard magnetic layers. In the design shown in FIG. 4A, there is no need for an exchange-biasing SAF shield such as 314 of FIGS. 3A and 3B, and it may be replaced with a simple soft magnetic material. In the embodiment of FIG. 4A, top shield 218, bottom shield 222 and mid-shield 406 are substantially entirely formed of a soft magnetic material. In some embodiments, the soft magnetic material may have a coercivity value smaller than about 100 Oe, for example, a permalloy (i.e., an alloy of nickel and iron). However, soft magnetic layers with any suitable coercivity values may be used. Hard biasing layers 404 bias the respective free layer or sensing layer 310 as well as the respective shield 218, 406 on top of the respective biasing layer 404. During formation of a multiple sensor reader such as 400, the sensor AFM 304 and the sensor SAF structure 306 of all the sensors (for example, sensors 402A and 402B) can be set along the y direction during an elevated temperature anneal, while the side biasing magnets 404 can be set to the x direction at room temperature without substantially disturbing sensor magnetic orientations of sensor AFM 304 and sensor SAF structure 306. This is because the sensor AFM 304 has a blocking temperature higher than room temperature during formation of the reader 400. With the design utilized in FIG. 4A, however, there is a limitation for substantially narrowing down individual sensors 402A and 402B of multiple sensor device 400 in the cross-track direction (i.e., the x direction), since the hard magnetic layers 404 cannot substantially shunt flux from adjacent bits in a manner that a soft magnetic material does. To address this, embodiments shown in FIGS. 4B-4E employ both hard magnetic layers and soft magnetic layers in the side biasing magnets.

Figure 4B:
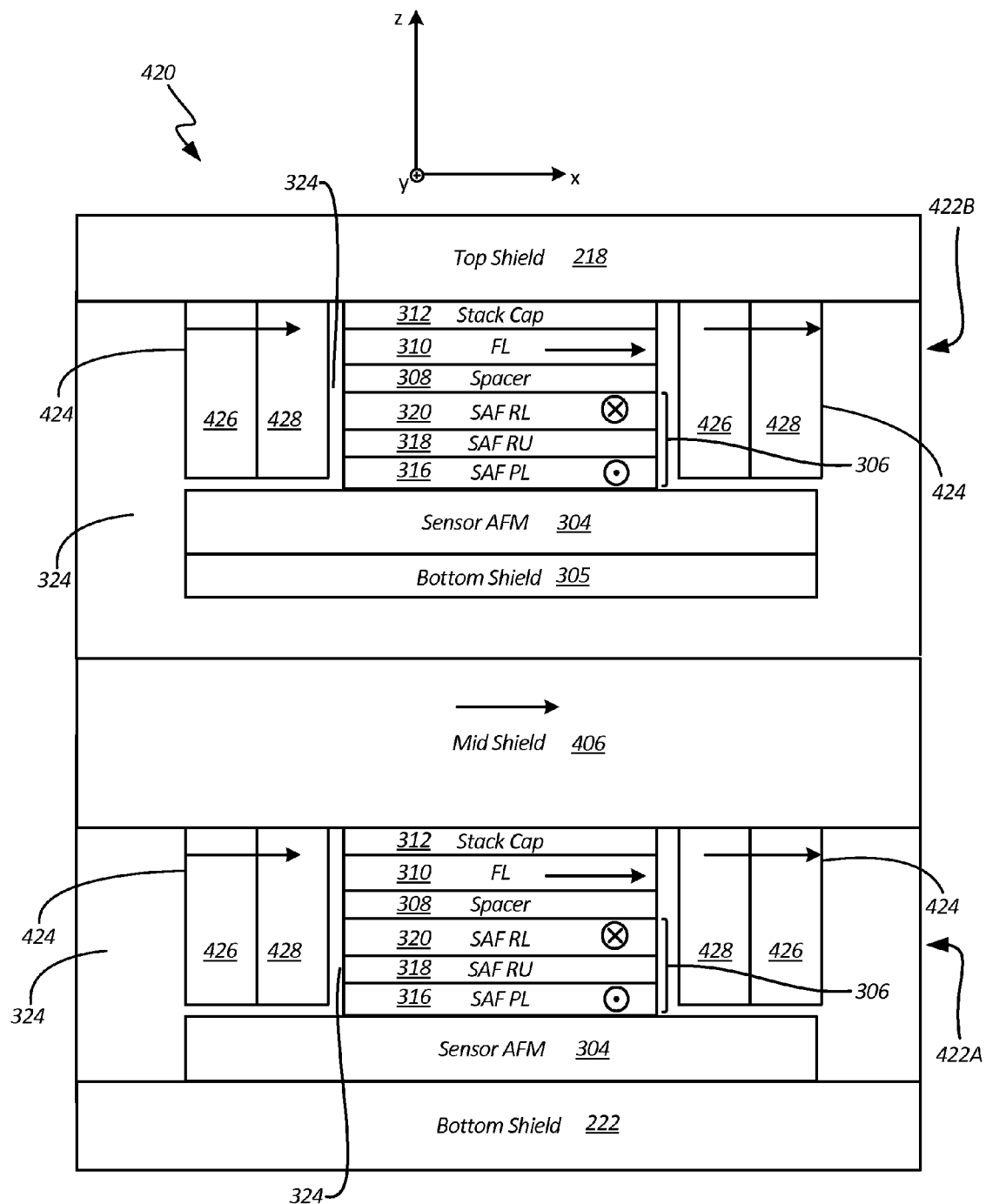

FIG. 4B is an air bearing surface view of a first embodiment of a multiple sensor reader (denoted by reference numeral 420) that employs both hard magnetic layers and soft magnetic layers in the side biasing magnets of its individual sensors 422A and 422B. In the embodiment shown in FIG. 4B, a hard magnetic layer 426 and a soft magnetic layer 428 are in a side-by-side configuration in each of side biasing magnets 424. The embodiment of FIG. 4B, may be viewed as an alteration to the embodiment of FIG. 4A (sensors 402A and 402B) in which the hard biasing layer in each of the sensors is spaced apart from the sensor stack with a soft magnetic layer that is inserted between the hard biasing layer and the sensor stack. In each of sensors 422A and 422B, the soft magnetic layer 428 is magneto-statically coupled to the hard magnetic layer 426 and serves to shunt flux from bits adjacent to the bit being read.

Figure 4C:
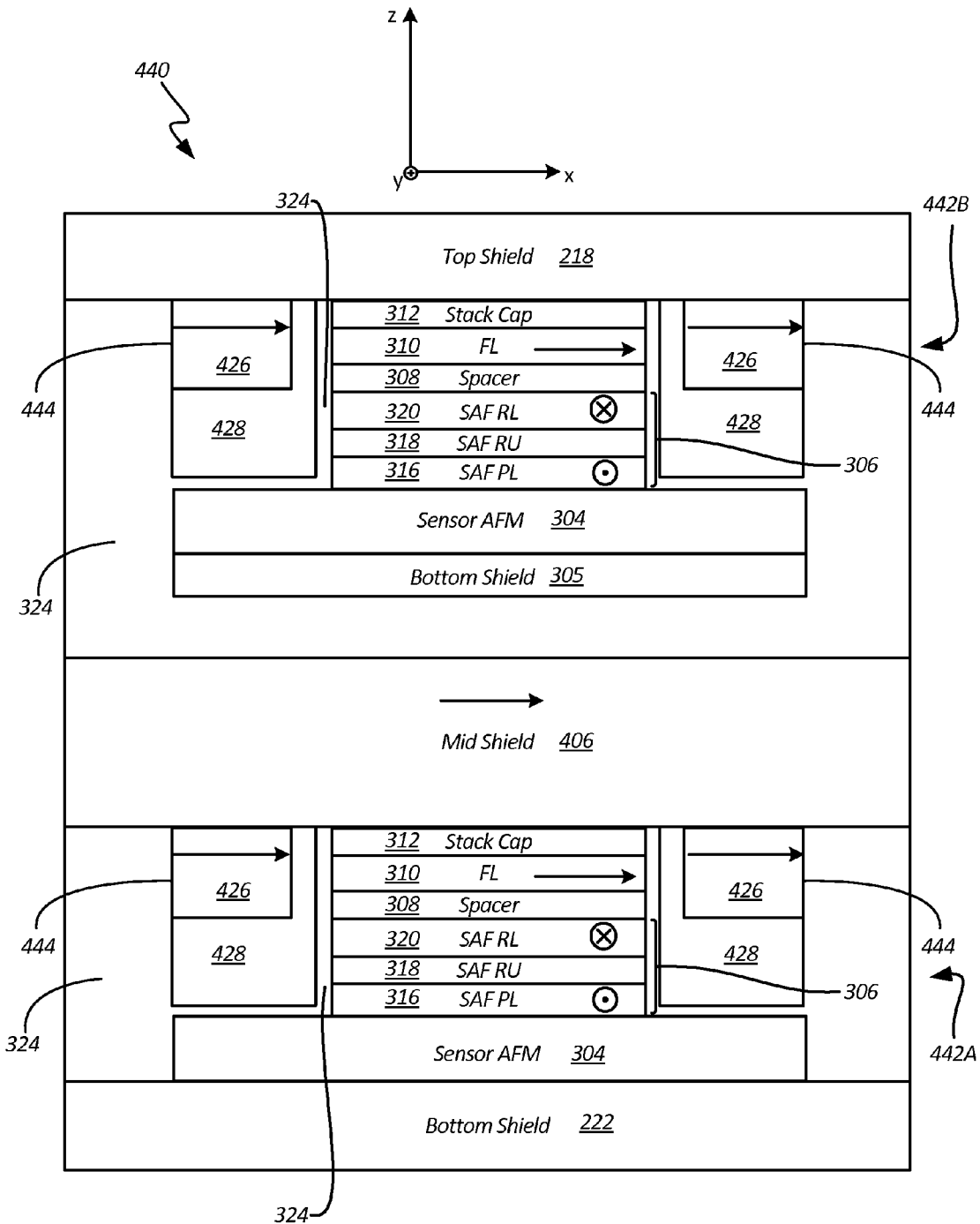

FIG. 4C is an air bearing surface view of a second embodiment of a multiple sensor reader (denoted by reference numeral 440) that employs both hard magnetic layers and soft magnetic layers in the side biasing magnets of its individual sensors 442A and 442B. In reader 440, side biasing magnets 444 include a soft magnetic layer 428 and a hard magnetic layer 426 deposited above the soft magnetic layer 428.

Figure 4D:
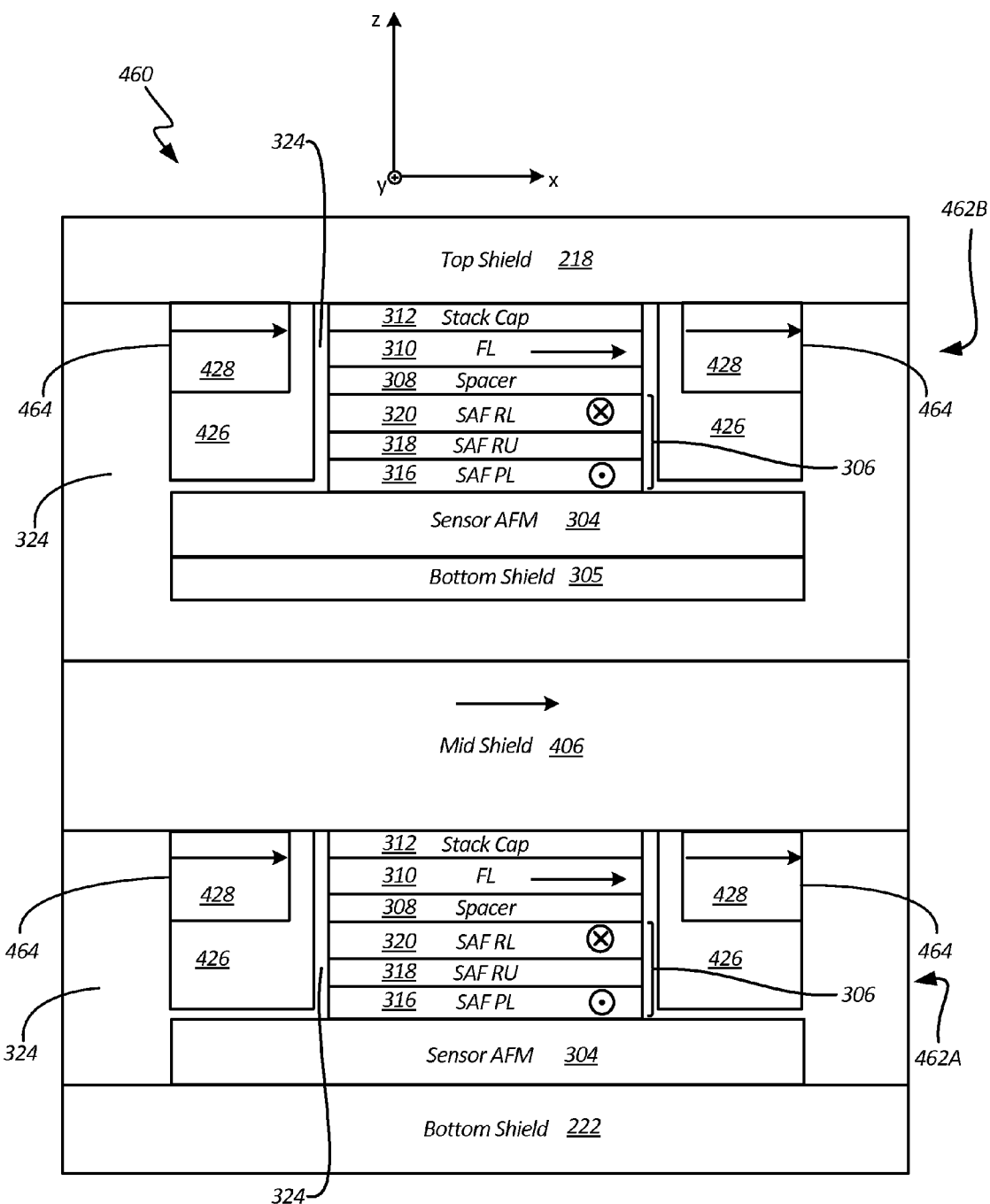

FIG. 4D is an air bearing surface view of a third embodiment of a multiple sensor reader (denoted by reference numeral 460) that employs both hard magnetic layers and soft magnetic layers in the side biasing magnets of its individual sensors 462A and 462B. In reader 460, side biasing magnets 464 include a hard magnetic layer 426 and a soft magnetic layer 428 deposited above the hard magnetic layer.

Figure 4E:
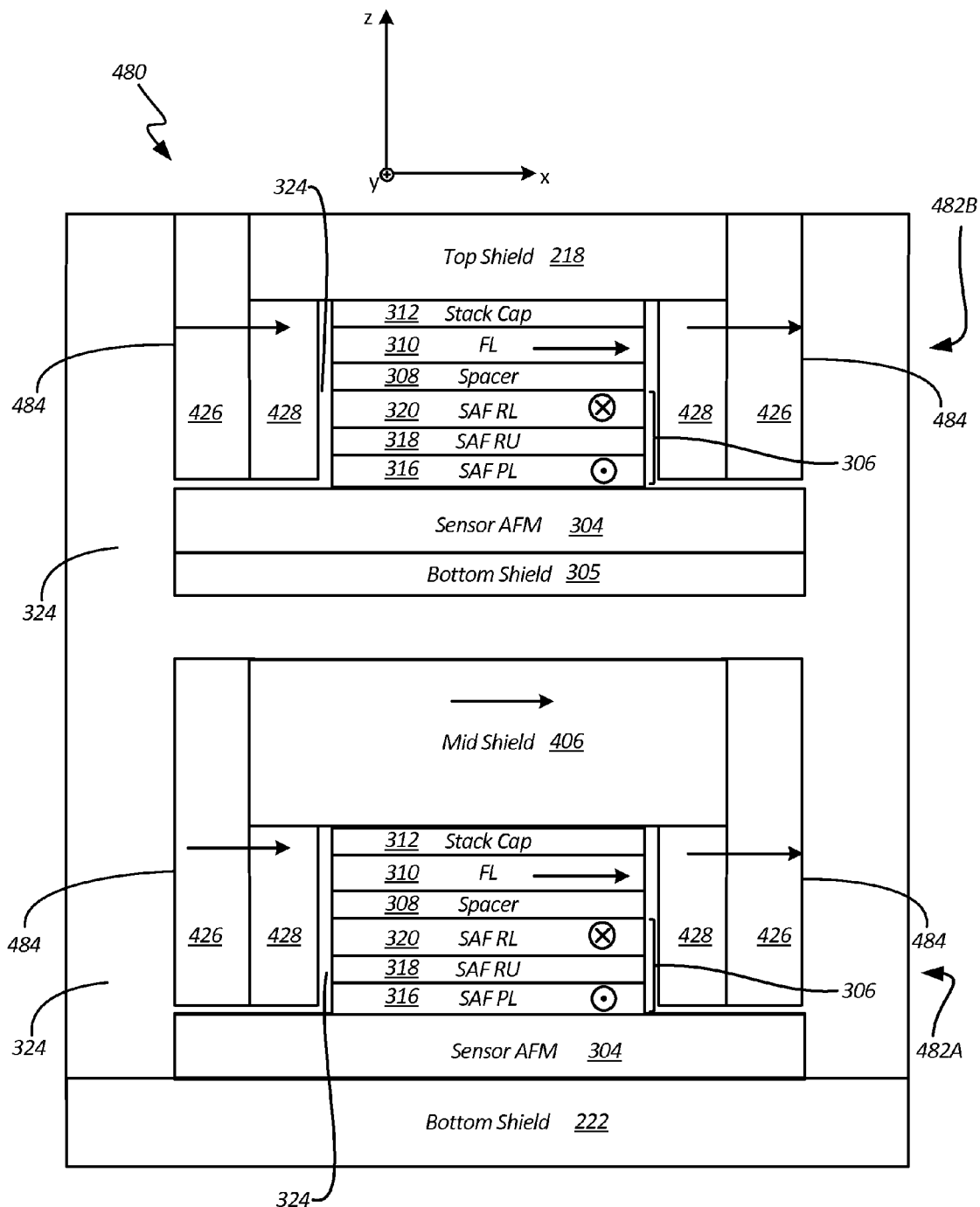

FIG. 4E is an air bearing surface view of a fourth embodiment of a multiple sensor reader (denoted by reference numeral 480) that employs both hard magnetic layers and soft magnetic layers in the side biasing magnets of its individual sensors 482A and 482B. In the embodiment shown in FIG. 4E, a hard magnetic layer 426 and a soft magnetic layer 428 are in a side-by-side configuration in each of side biasing magnets 484. Additionally, portions of hard magnetic layers 426 in sensor 482A extend into regions on either side of mid-shield 406 and bias mid-shield 406. Similarly, portions of hard magnetic layers 426 in sensor 482B extend into regions on either side of top shield 218 and bias top shield 218. In each of sensors 482A and 482B, the soft magnetic layer 428 is magneto-statically coupled to the hard magnetic layer 426 and serves to shunt flux from bits adjacent to the bit being read.

In some embodiments described below, stabilization of the side biasing magnets is carried out by exchange coupling the side biasing magnets such as 322 in each of sensors 302A and 302B of FIG. 3B, for example, to corresponding SAF shield structures such as 314 in each of sensors 302A and 302B. In such a design, it needs to be ensured that a blocking temperature of the SAF shield AFM (such as 332 of sensors 302A and 302B) is different from a blocking temperature of the sensor stack AFM (such as 304 of sensors 302A and 302B). In some embodiments, the blocking temperature of the sensor stack AFM is higher than the blocking temperature of the SAF shield AFM for an improved sensor signal-to-noise ratio and improved sensor stability. To have a lower blocking temperature of the SAF shield AFM relative to the blocking temperature of the sensor stack AFM, different materials having different blocking temperatures may be used for the SAF shield AFM and the sensor stack AFM. However, when a same material (for example, IrMn) is used for both AFM elements, it is necessary that they are processed differently. Additional details regarding such embodiments are provided below in connection with FIG. 5.

It is known that a blocking temperature of an AFM is related to a value of KuV (where Ku is anisotropy energy and V is grain size). Thus, different KuV values may result in different blocking temperatures. It is also known that, when forming an IrMn film, for example, with a PVD (physical vapor deposition) process, KPIVs (key process input values) for KuV include substrate temperature during growth, and film thickness. Therefore, deposition at a relatively high temperature and a relatively thick film may be suitable for the sensor stack AFM, and room temperature deposition and a relatively thin film may be suitable for the SAF shield AFM. In general, to achieve a desired blocking temperature, either hot or room temperature deposition may be used for AFM films. However, room temperature deposition allows for a relatively thicker AFM film than hot deposition at a same blocking temperature. When a relatively thick AFM film is used, potential surface damage effects (from a high temperature anneal) are minimized and better pinning may be achieved. Accordingly, a room temperature AFM may be used for the SAF shield AFM in order to obtain a relatively low blocking temperature.

Figure 5A:
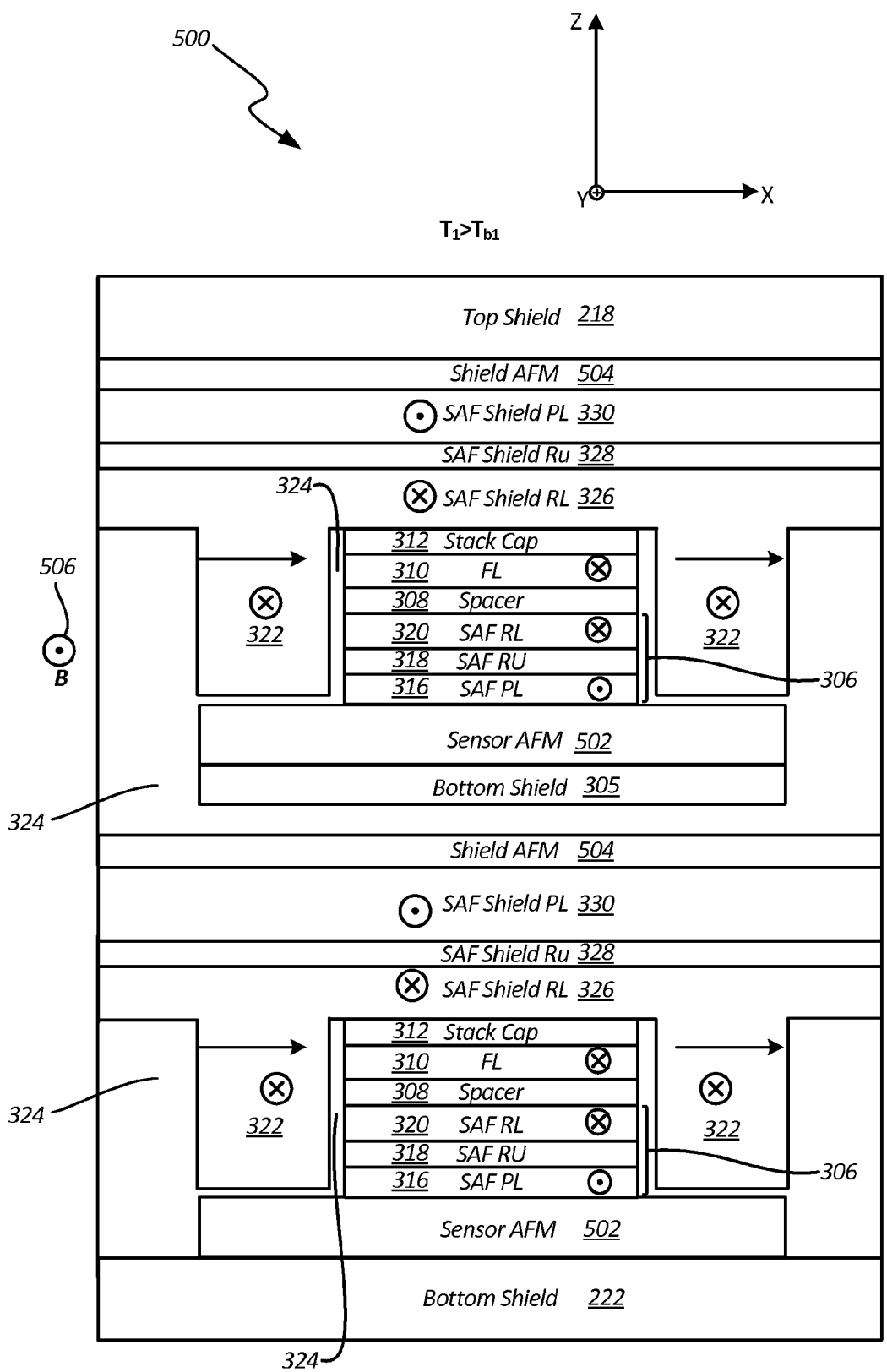
FIGS. 5A and 5B are bearing surface views of a multiple sensor reader in accordance with one embodiment.
Figure 5B:
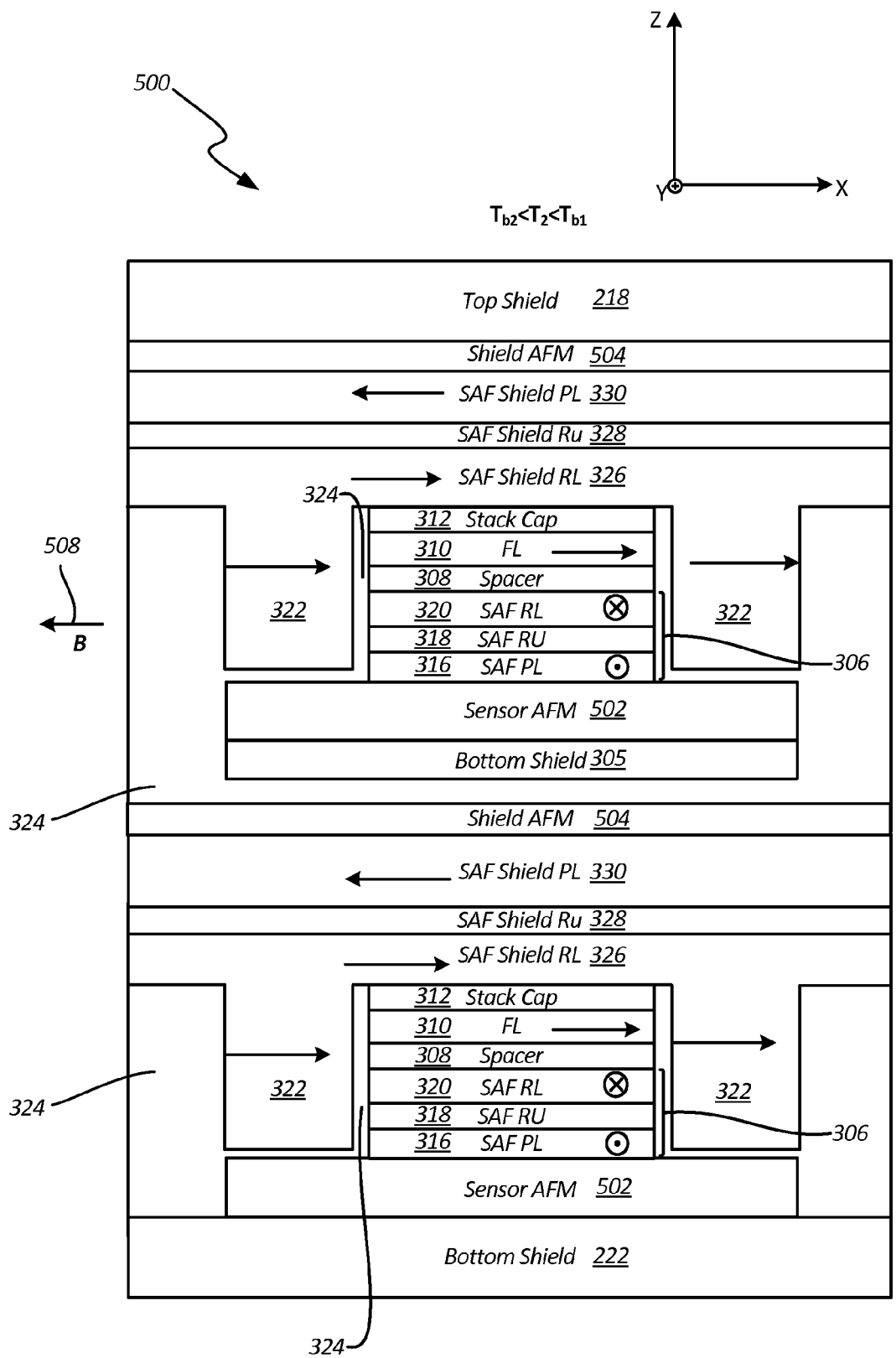

FIGS. 5A and 5B are bearing surface views that show magnetization directions in different layers of a multiple sensor reader 500 during first and second annealing steps, respectively. In sensor 500, sensor stack AFM 502 has a blocking temperature of Tb1 and SAF shield AFM 504 has a blocking temperature of Tb2 (with Tb2<Tb1). In some embodiments, the blocking temperature difference between Tb1 and Tb2 is about 50 degrees centigrade or greater. In the first annealing step shown in FIG. 5A, when the structure 500 is annealed at a temperature T1 that is higher than Tb1 with a y-direction magnetic field 506, both the sensor stack SAF layers 316 and 320, and the SAF shield layers 326 and 330 are set to the same magnetic field direction 506 (the y direction in this case). FIG. 5B shows that when a subsequent anneal is carried out at a temperature T2 such that Tb2<T2<Tb1 with an x direction magnetic field 508, magnetization directions of the SAF shield layers 326 and 330 and side biasing magnets 322 are set to the x direction while the stack AFM 502 and corresponding magnetization directions of sensor stack SAF layers 316 and 320 are not disturbed. It should be noted that side biasing magnets 322 in multi-sensor reader 500 are substantially entirely formed of soft magnetic material.

Figure 6A:
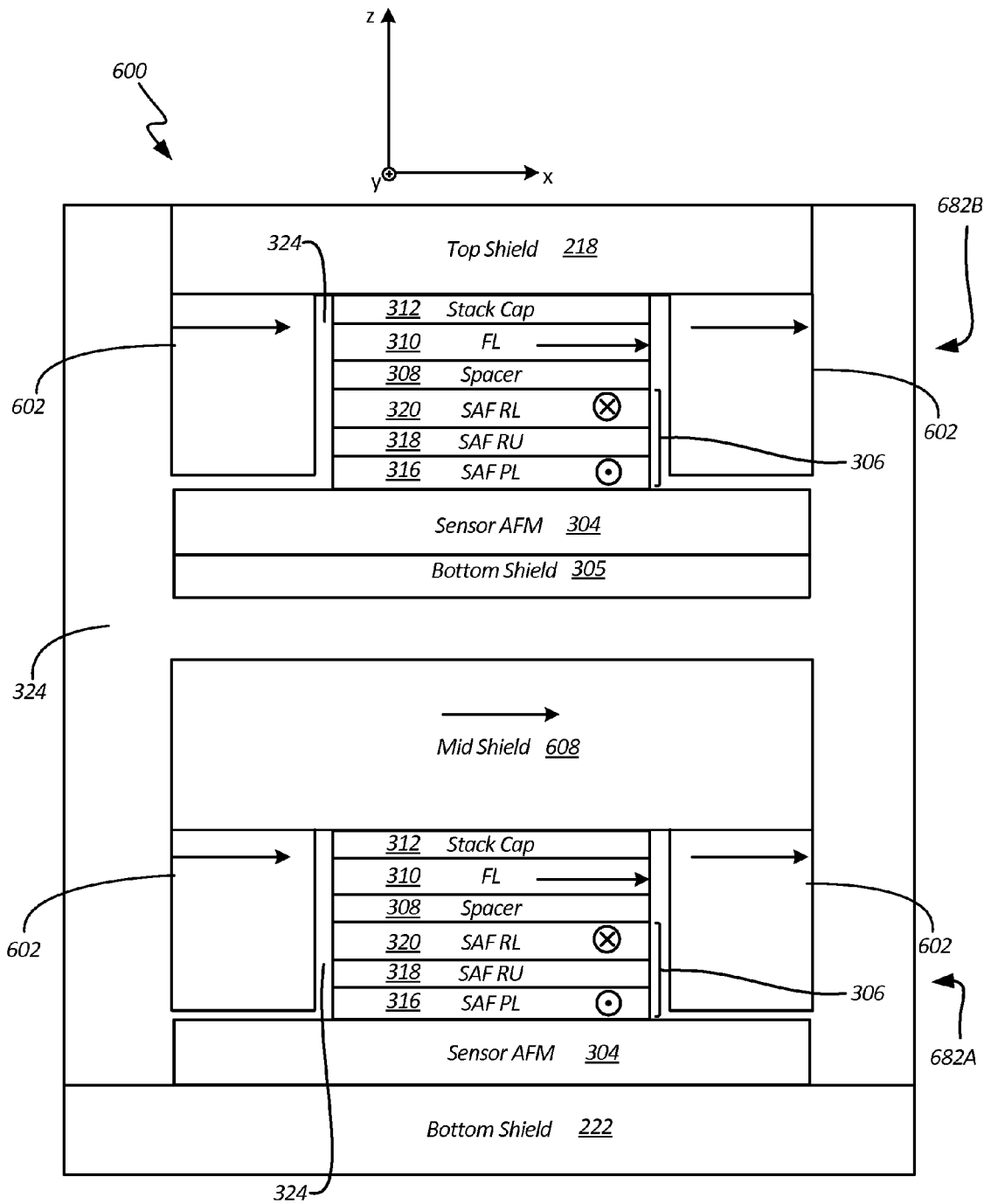
FIG. 6A is a bearing surface view of a multiple sensor reader in accordance with one embodiment.
Figure 6B:
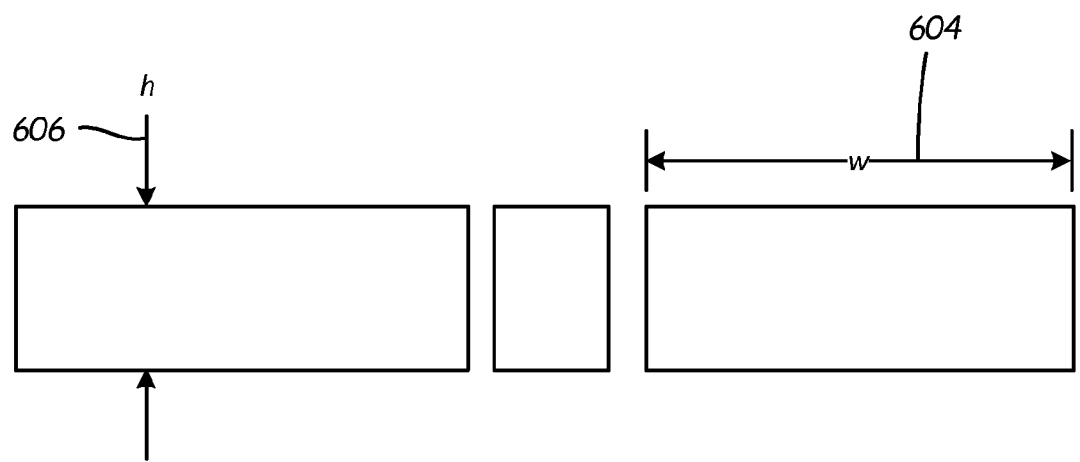
FIG. 6B is a top view showing side biasing magnets of the reader of FIG. 6A.

Yet another embodiment utilizes side biasing magnets that are stabilized by shape anisotropy. FIG. 6A is a bearing surface view of a multiple sensor reader 600 in accordance with one such an embodiment, and FIG. 6B shows a top view of side biasing magnets of reader 600. In reader 600, a width, w (denoted by reference numeral 604), of a side biasing magnet 602 along the x direction is substantially larger than a height, h (denoted by reference numeral 606), of the side biasing magnet 602 along the y direction. In such an embodiment, a mid-shield 608 may have a same width-to-height ratio as the side biasing magnet. In a particular embodiment, the width, w, of each of the side biasing magnet 602 and the mid-shield 608 is at least twice as large as the height, h, of the side biasing magnet 602. It should be noted that side biasing magnets 322 in multi-sensor reader 600 are substantially entirely formed of soft magnetic material.

It should be noted that any suitable combinations of the above-described embodiments may be used in different applications. For example, in some embodiments, hard magnetic layers may be included in the side biasing magnets and the side biasing magnets may be exchange coupled to SAF shielding structures. In some other embodiments, hard magnetic layers may be included in the side biasing magnets and the side biasing magnets and mid-shields may have a shape anisotropy shown in FIG. 6B. In further embodiments, the side biasing magnets may include only soft magnetic material and be exchange coupled with SAF shielding structures, and also include a shape anisotropy shown in FIG. 6B.

Figure 7A:
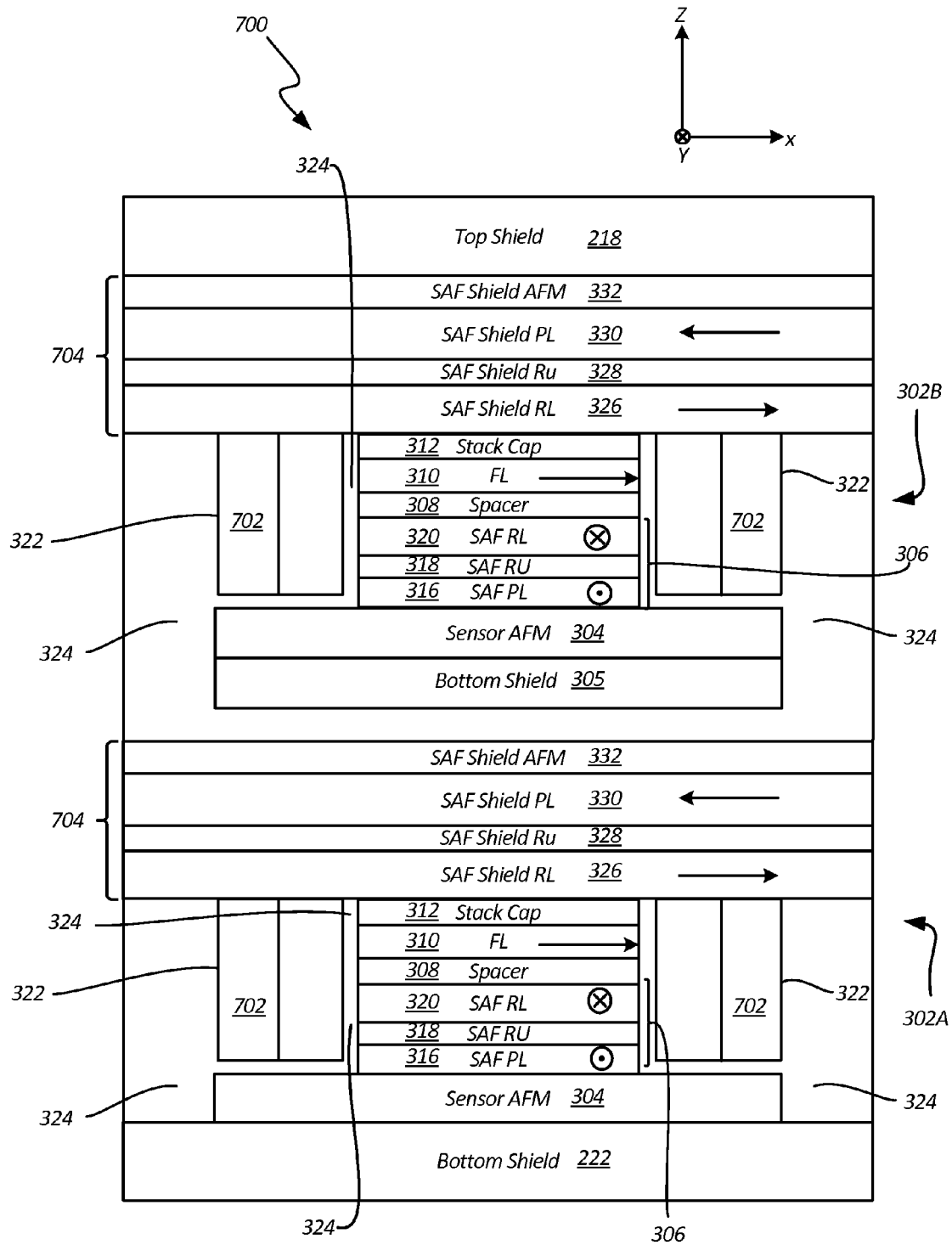
FIG. 7A is a bearing surface view of a multiple sensor reader in accordance with an embodiment that combines features of other embodiments.
Figure 7B:
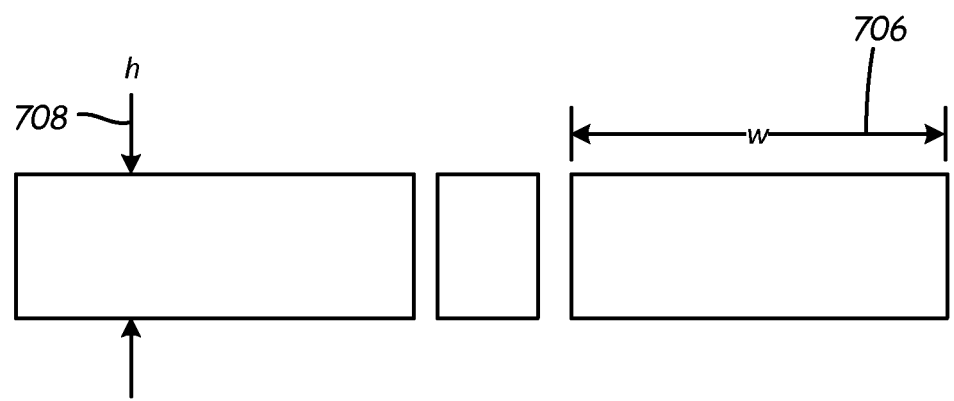
FIG. 7B is a top view showing side biasing magnets of the reader of FIG. 7A.

Some embodiments may include a combination of stabilization features that comprise hard magnetic layers, exchange coupling of SAF shielding structures to side biasing magnets and also shape anisotropy. Such an embodiment is shown in FIGS. 7A and 7B. FIG. 7A is a bearing surface view of a multiple sensor reader 700 in accordance with such a combined embodiment, and FIG. 7B shows a top view of side biasing magnets of reader 700. In FIG. 7A, hard magnetic layers are denoted by reference numeral 702, SAF shielding structures that are exchange coupled to the side biasing magnets 322 are denoted by reference numeral 704, and a width and a height of side biasing magnets are denoted by reference numerals 706 and 708, respectively. It should be noted that hard magnetic layers 702 may be positioned in any suitable region within side biasing magnets 322. The description provided earlier in connection with the individual embodiments applies to the combined embodiment shown in FIGS. 7A and 7B and therefore that description is not repeated.

It should be noted that the above-described embodiments show side biasing magnets as biasing elements for the sensing or free layers. However, in different embodiments, any suitable sensing-layer biasing feature positioned in any suitable location within the sensor and proximate to the sensing layer may be utilized to bias the sensing layer. Of course, as described above, in the different embodiments, a sensor stabilization feature is included with the sensing-layer biasing feature.

Figure 8:
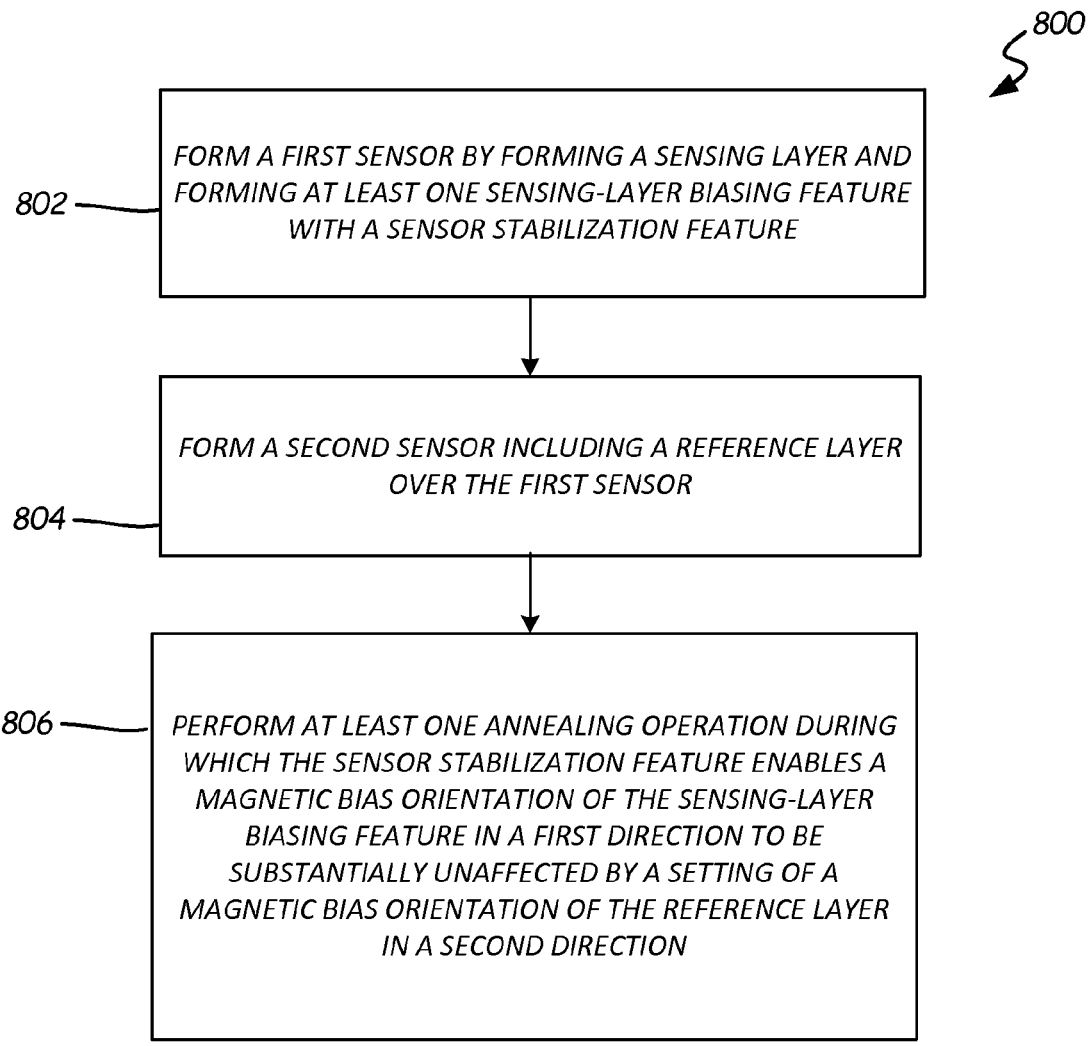
FIG. 8 is a simplified flow diagram of a method embodiment.

FIG. 8 shows a simplified flow diagram 800 of a method of forming a multi-sensor reader in accordance with one embodiment. At step 802, a first sensor is formed by forming a sensing layer and forming at least one sensing-layer biasing feature with a sensor stabilization feature. This is followed by step 804 at which a second sensor is formed over the first sensor. The second sensor includes a reference layer. At step 806, at least one annealing operation is performed during which the sensor stabilization feature enables a magnetic bias orientation of the sensing-layer biasing feature in a first direction to be substantially unaffected by a setting of a magnetic bias orientation of the reference layer in a second direction.

It should be noted that, in some embodiments, different stabilization methods may be employed in different individual sensors of a multi-sensor reader. For example, a particular multi-sensor reader embodiment may utilize a hard magnetic layer for biasing its bottom sensor (for example, as used in bottom sensor 402A of FIG. 4A), while employing a soft magnet as the stabilization structure for the top sensor (for example, as used in top sensor 302B of FIG. 3B). This can be advantageous in some cases, since the hard magnet of the bottom sensor may be "reset" using a high field setting magnet that would not disturb the magnetization of the SAF structures at low temperatures. It should also be noted that, although the different figures show bottom and top sensors (for example, 402A and 402B) aligned with each in the z direction, different sensors may be offset from each other in various embodiments.

Although various examples of stabilization features within multiple sensor magnetic reproducing devices are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the multiple sensor magnetic reproducing device with the stabilization feature while maintaining substantially the same functionality without departing from the scope and spirit of the present disclosure. In addition, although the embodiments described herein are directed to a particular type of substantially stabilized multiple sensor magnetic reproducing device utilized in a particular data storage system, it will be appreciated by those skilled in the art that the teachings of the present disclosure can be applied to other data storage devices without departing from the scope and spirit of the present disclosure.

What is claimed is:

1. A method of forming a multi-sensor reader comprising:
   forming a first sensor by:
      forming a sensor antiferromagnetic (AFM) layer by a first deposition process that is carried out at a first deposition temperature to produce a deposited sensor AFM layer having a first blocking temperature;
      forming a sensing layer; and
      forming at least one sensing-layer biasing feature with a sensor stabilization feature;
   forming a shielding structure over the first sensor, wherein forming the shielding structure comprises forming a shield AFM layer by a second deposition process that is carried out at a second deposition temperature to produce a deposited shield AFM layer having a second blocking temperature, and wherein the second deposition temperature is different from the first deposition temperature, and wherein the second blocking temperature is less than the first blocking temperature;
   forming a second sensor over the shielding structure, wherein forming the second sensor includes
      forming a reference layer; and
   performing at least one annealing operation at an annealing temperature during which the sensor stabilization feature enables a magnetic bias orientation of the sensing-layer biasing feature in a first direction to be substantially unaffected by a setting of a magnetic bias orientation of the reference layer in a second direction, wherein the annealing temperature is different from the first blocking temperature and different from the second blocking temperature, and wherein the at least one annealing operation at the annealing temperature is carried out after;
      the deposited sensor AFM layer having the first blocking temperature is produced by the first deposition process at the first deposition temperature; and
      the deposited shield AFM layer having the second blocking temperature is produced by the second deposition process at the second deposition temperature.

2. The method of claim 1 and wherein forming at least one sensing-layer biasing feature with the sensor stabilization feature comprises depositing a hard magnetic layer proximate to the sensing layer.

3. The method of claim 2 and wherein forming at least one sensing-layer biasing feature with the sensor stabilization feature comprises depositing a soft magnetic layer between the hard magnetic layer and the sensing layer.

4. The method of claim 1 and wherein forming at least one sensing-layer biasing feature with the sensor stabilization feature comprises:
   forming a soft magnetic biasing layer proximate to the sensing layer;
   forming the shielding structure over the soft magnetic biasing layer, wherein the shielding structure comprises a synthetic anti-ferromagnetic (SAF) structure and the shield AFM layer; and
   exchange coupling the synthetic anti-ferromagnetic shielding structure to the soft magnetic biasing layer.

5. The method of claim 1 and wherein forming at least one sensing-layer biasing feature with the sensor stabilization feature comprises:
   forming a soft magnetic biasing layer proximate to the sensing layer, the soft magnetic layer having the magnetic bias orientation in the first direction; and
   shaping the soft magnetic layer in a manner that preserves the magnetic bias orientation of the soft magnetic layer in the first direction after the at least one annealing operation.

6. The method of claim 1 and further comprising controlling a thickness of the shield AFM layer and the second blocking temperature of the shield AFM layer by selecting the second deposition temperature to be substantially lower than the first deposition temperature and by carrying out the second deposition process at the second temperature.

* * * * *